United States Patent
Washburn, IV

(10) Patent No.: US 7,841,159 B2
(45) Date of Patent: Nov. 30, 2010

(54) ROTARY MOWER BLADE INTEGRATING AERODYNAMIC ELEMENTS

(76) Inventor: Edward Nollie Washburn, IV, 2328 Bostic Sunshine Hwy., Bostic, NC (US) 28018

( * ) Notice: Subject to any disclaimer, the term of this patent is extended or adjusted under 35 U.S.C. 154(b) by 0 days.

(21) Appl. No.: 12/332,286

(22) Filed: Dec. 10, 2008

(65) Prior Publication Data

US 2010/0139231 A1    Jun. 10, 2010

(51) Int. Cl.
*A01D 34/73* (2006.01)
(52) U.S. Cl. ........................................ 56/295
(58) Field of Classification Search ............... 56/255, 56/295, 17.5

See application file for complete search history.

(56) References Cited

U.S. PATENT DOCUMENTS

| | | | | |
|---|---|---|---|---|
| 3,780,509 A * | 12/1973 | Woelffer | ........................ | 56/295 |
| 5,321,940 A * | 6/1994 | Peterson | ........................ | 56/255 |
| 5,353,581 A * | 10/1994 | Rouse et al. | ................... | 56/255 |
| 5,619,846 A * | 4/1997 | Brown | ........................... | 56/255 |
| 5,669,213 A * | 9/1997 | Britton | ......................... | 56/17.5 |
| 7,506,494 B2 * | 3/2009 | Eavenson et al. | ............. | 56/17.5 |

* cited by examiner

*Primary Examiner*—Robert E Pezzuto
(74) *Attorney, Agent, or Firm*—Welsh Flaxman & Gitler LLC

(57) ABSTRACT

An embodiment of an overall approximately rectangular rotary mower blade, affixed to a powered support shaft, where the support shaft rotates the blade tines on a rotational plane parallel to the vegetation to be cut, where the blade employs aerodynamic tines preceding the main cutting edge. Features of the aerodynamic tines improve cutting, mulching, and safety of mower operation.

6 Claims, 4 Drawing Sheets

ROTARY MOWER BLADE INTEGRATING AERODYNAMIC ELEMENTS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

This invention relates to rotary mower vegetation cutting blades of the type that are affixed to a powered rotating support assembly, usually mounted under a protective deck structure, where the blade rotates parallel to the surface to be mowed.

2. Discussion of Prior Art

Powered rotary mowers are used for vegetation control and lawn grooming. To enhance grass health and beauty, a higher cutting height is often desired. Higher vegetation cutting height is especially needed in the event of dry weather should local water conservation ordinances lead to insufficient ground moisture. In order to discharge clippings, present mower blades are designed such that strong airflow is created within the cutting deck. When attempting to cut vegetation at higher heights, contrary to previous blade design intentions, the strong airflow inside the mower deck causes vegetation to lie down. Vegetation that is not standing erect is more difficult to cut. Improving aerodynamic manipulation of the blade induced airflow inside the mowing deck, will enhance cutting and mulching of vegetation at all cutting heights.

Mulching action is somewhat incomplete with present designs, since the clippings to be shredded are accelerated inside the deck and thereby carried along with the airflow. To disrupt the airflow inside the mowing deck, deflectors mounted inside the mower deck have been designed, which are intended to interfere with mowing deck airflow. One such blade is described in U.S. Pat. No. 5,212,938 to Zenner et al. Deck mounted air deflectors only work well in dry conditions. Attempting to mow vegetation that is not completely dry will quickly clog deck mounted air deflectors. Higher costs to produce intricate mowing deck features contribute to the reasons complex mowing deck mulching designs have not been accepted by the marketplace.

Several mower blades designs include raised shredding members such as is described in U.S. Pat. No. 6,487,840 to Turner et al and U.S. Pat. No. 5,291,725 to Meinerding. These blades employ top mounted vertical shredding members designed to rip apart clippings after the primary cutting edge has severed the vegetation from the rooted plant. Mowing deck circular airflow immediately accelerates cut clippings causing the relative speed between the mowing blade mulching members and the vegetation trimmings to be relatively low. Once clippings become airborne, impacts by blade cutting members are less effective since the clippings have little mass and the clippings are traveling in the same direction and speed as the secondary cutting edges.

Blades such as described in U.S. Pat. No. 6,7470,662 to Burke et al and U.S. Pat. No. 5,321,940 to Peterson illustrate rotary mulching blades that cut and shred vegetation featuring the blade leading edge as the primary cutting surface. Cutting vegetation multiple times at multiple heights by multiple cutting edges, while the vegetation is still connected to the rooted plant improves shredding and mulching action, since the vegetation to be shredded held stationary, and thereby impacted more forcefully by the cutting edges.

Blades such as U.S. Pat. No. 6,145,290 to Sullivan employ secondary cutting edges integrated interior to the primary cutting edge which are intended to mulch clippings. A rotating blade's maximum velocity occurs at the area most removed from the rotating vertical supporting assembly axis. Our tests have found that cutting action drops significantly when cutting edges are placed more than approximately four inches (100 mm) from a mower blade's extreme end. Safety regulations limiting the rotational speed of mower blades contribute to the reduction in shredding effectiveness of interior cutting edges. Mowing and mulching efficiency of a rotary mower blade is at a maximum when the cutting edges are designed into the area most removed from the rotational axis, the blade's extreme ends.

Since a rotating blade can impact and forcefully throw objects, safety blades have been designed. U.S. Pat. No. 2,859,581 to Kroll et al and U.S. Pat. No. 3,336,737 to Belfiore describes a circular disk that is intended to push foreign objects aside. While these disk blades may improve safety, these circular blades must use aerodynamic forces to direct vegetation into the path of the primary vegetation cutting edges. Air is a fluid having the properties of viscosity and adhesion which results in atmospheric friction, also called "skin resistance" or "drag." A circular disk-shaped blade effectively accelerates air by atmospheric friction inside the mowing deck. Strong circular air currents induced by a disk-shaped blade within a mowing deck causes vegetation to lie down which is a feature not desirable in a mower blade design. Rapidly flowing air currents flowing in circular fashion inside a mowing deck largely nullifies the aerodynamic and cutting elements designed into these blades. Evidence to this is found under Pat. No. 1,061,206 dated May 6, 1913 to Nikola Tesla describing a turbine employing smooth circular disks that efficiently capture energy from moving gaseous fluids by "skin resistance." Since a disk can capture energy, a powered rotating disk can also impart energy into a surrounding fluid. Additionally, rotary mowers employing circular disk blades do not provide an easy escape path for vegetation clippings which promotes clogging of the mowing deck, especially in moist conditions. A circular disk blade is more massive and therefore more expensive to produce which also accounts for its lack of acceptance in the marketplace.

A similar airflow problem exists in Canadian Patent 2,259,040 to Meinerding. A feature of lifting vegetation to be cut by secondary cutting edges installed directly behind a primary cutting surface is shown in FIG. 1, detail 42, and 43. These features are too small to be aerodynamically effective and are mounted directly forward of the vertical shredding members FIG. 1, detail 48, further impeding free airflow. Our tests conclude that this complex, expensive to produce design, also suffers from sever clogging in all but the most dry mowing conditions.

Canadian Patent 2,165,845 to Parkinson employs multiple cutting edges of varying heights, however the design spaces out the cutting members. Many other patents feature cutting members that are substantially spaced apart. Large spacing between cutting members thereby requires the blade to rotate a relatively large angle before the next cutting member will interact with vegetation. For maximum mulching and cutting action, primary and secondary blade members should be grouped closely together, requiring a minimum of blade rotation to complete the cutting action of all interacting blade members. Canadian Patent 2,165,845 to Parkinson also suffers from a common problem associated with all complex designs, which mandates more intricate manufacturing and material requirements which drive costs, and thereby prices well out of the range acceptable in the marketplace.

SUMMARY OF THE INVENTION

A rotary mowing blade designed to rotate on a plane parallel to the vegetation to be cut, mounted on a perpendicular rotating powered assembly, employing vegetation shredding and aerodynamic vegetation directing members immediately anterior to the primary cutting member. Arrangement and shape of these anterior aerodynamic members yields an improvement in cutting action and safety over previous blade designs. Also included is a dual purpose downward turned aerodynamic feature located at the trailing edge of the primary cutting member designed to accomplish both a gentle vegetation dethatching action and to decrease the atmospheric pressure directly above the primary cutting member. The invention in all variations is designed to reduce the cost of manufacturing, thereby improving acceptance in the marketplace.

DETAILED DESCRIPTION OF THE INVENTION

According to an embodiment of the present invention, the design is an elongated generally rectangular vegetation cutting multi-edge blade apparatus intended to be used on rotary mowers, affixed to and rotated by a powered support assembly, where the support assembly rotates the blade cutting members on a rotational plane parallel to the vegetation to be cut.

Figure 1:
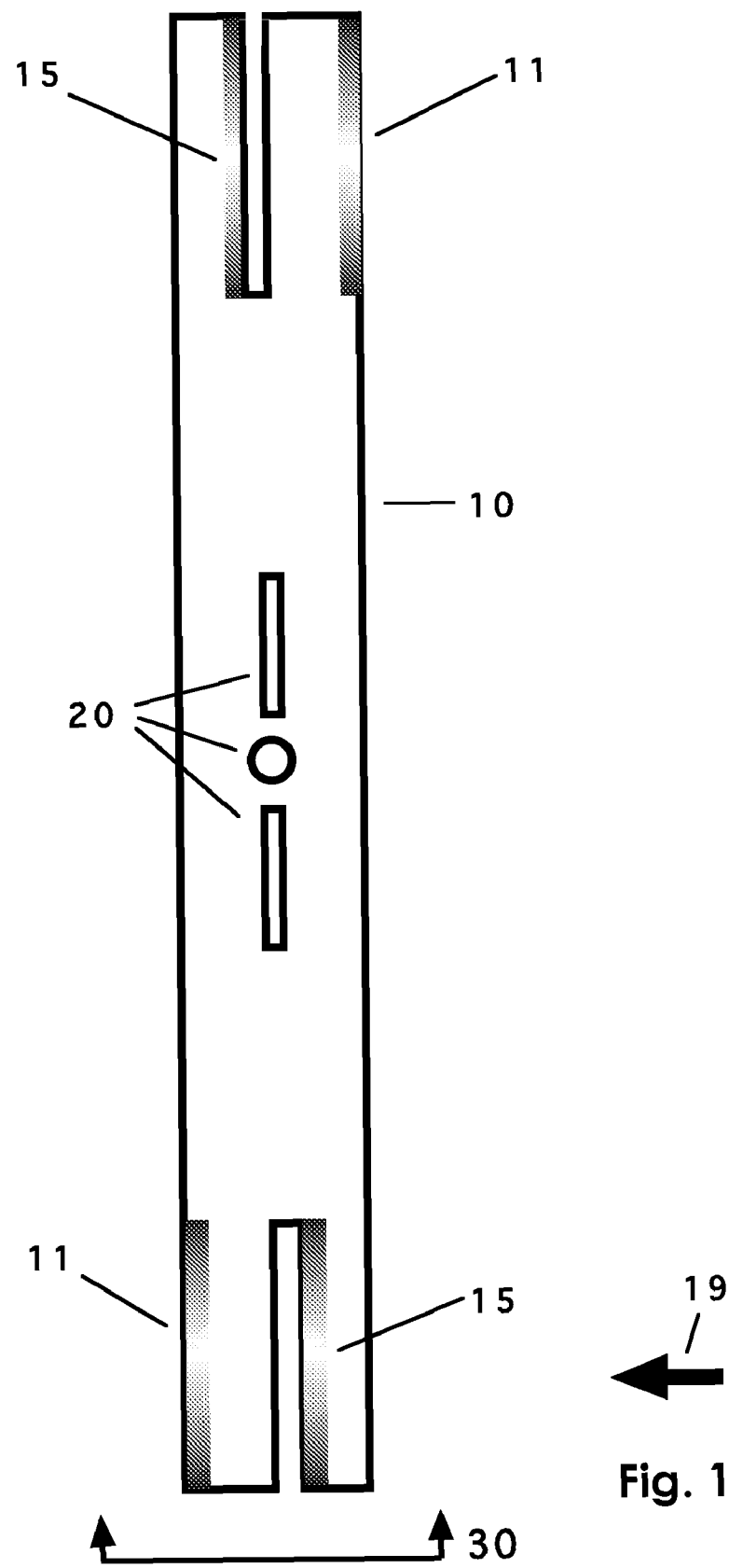
FIG. 1 is a top view of a rotating generally rectangular mower blade 10, integrating industry standard blade mounting openings 20, equipped with a single vegetation shredding and aerodynamic directing member 11, installed anterior to the primary cutting member 15. Rotational direction in this illustration is indicated by arrow 19.

FIG. 1 shows a top view of one embodiment of the blade 10 having a single vegetation shredding and aerodynamic vegetation directing member 11, and a primary vegetation cutting member 15 per each blade end. Rotational direction is illustrated by arrow 19. The blade 10, as shown is equipped with cutout holes 20 allowing mounting on many existing mowers. The aerodynamic directing member 11 shown in FIG. 1 is configured at an acute angle in close proximity to member 15 in a manner to aerodynamically direct vegetation onto the sharpened primary cutting edge on member 15. Close proximity of members 11 and 15 enhances aerodynamic interaction.

Figure 2:
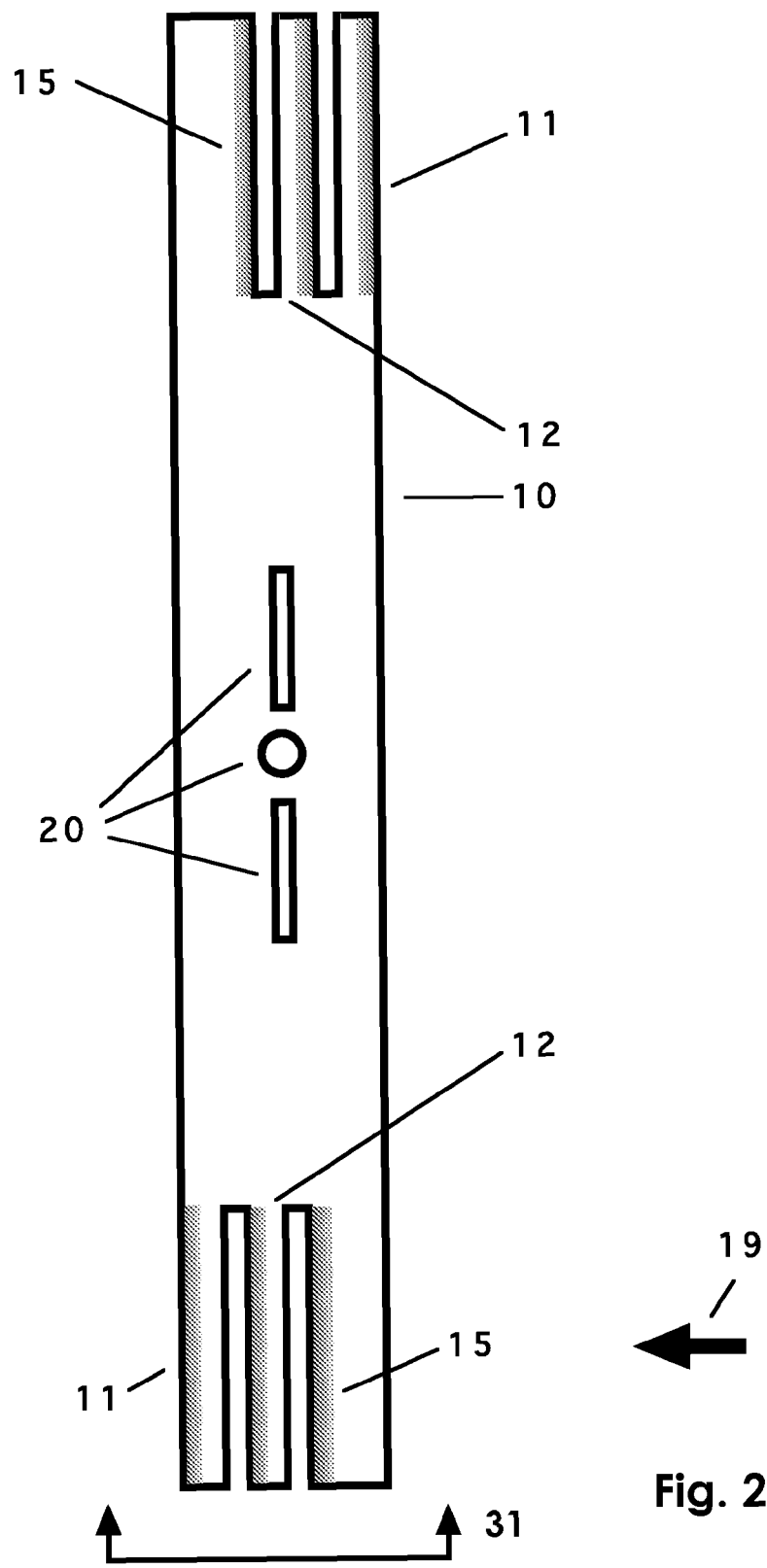
FIG. 2 is a top view of a generally rectangular mower blade 10, including industry standard blade mounting openings 20, equipped with two vegetation shredding and aerodynamic directing members 11 and 12, installed anterior to the primary cutting member 15. Rotational direction in this illustration is indicated by arrow 19.

FIG. 2 displays a similar top view of the blade 10 having a plurality of vegetation shredding and aerodynamic vegetation directing members, detail 11 and 12, ahead of the primary vegetation cutting member 15. The blade 10 may employ more than two vegetation shredding and aerodynamic vegetation directing members 10 and 11 per each blade end.

Figure 3:
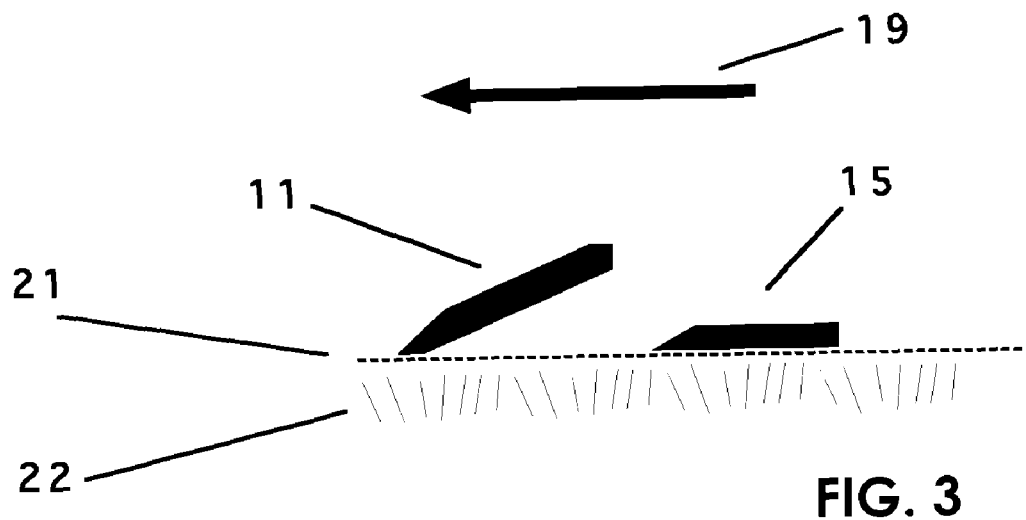
FIG. 3 is an edge view of the blade in FIG. 1 taken along the line 30, displaying one acute angled vegetation shredding and aerodynamic directing member 11, and the primary cutting member 15. Both cutting edges are set roughly to the same vegetation 22 cutting height 21. Blade cutting direction in this illustration is indicated by arrow 19.

FIG. 3, is a longitudinal edge view of blade 10 of FIG. 1 along line 30, depicting the orientation of the vegetation shredding and aerodynamic vegetation directing member 11 to the primary cutting member 15. The acute angle of member 11 induces a substantial aerodynamic force directly behind said member 11.

Figure 4:
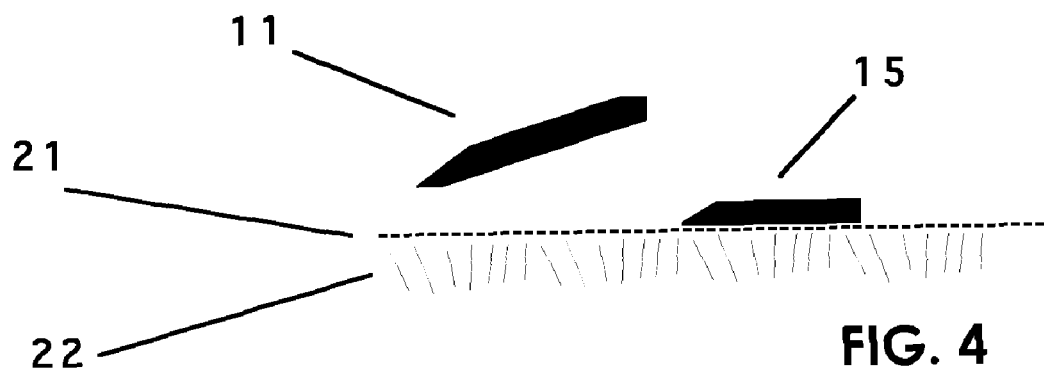
FIG. 4 is an edge view of the blade in FIG. 1 taken along the line 30, displaying one acute angled vegetation shredding and aerodynamic directing member 11, and the primary cutting member 15, where the cutting members 11 and 15 are set to different vegetation 22 cutting heights 21. Blade cutting direction in this illustration is indicated by arrow 19.

A variation of the embodiment, FIG. 4, is a longitudinal edge view of blade 10 of FIG. 1 along line 30, similar to FIG. 3, with the exception that the vegetation shredding and aerodynamic vegetation directing member 11 orientation to the primary cutting member 15 is not set to the same cutting height. The arrangement in FIG. 4 improves mulching action since the elevated leading edge of aerodynamic member 11 cuts vegetation at an elevated level while the vegetation is still attached to the vegetation roots. Primary cutting member 15 then cuts the vegetation to the final cutting height.

Figure 5:
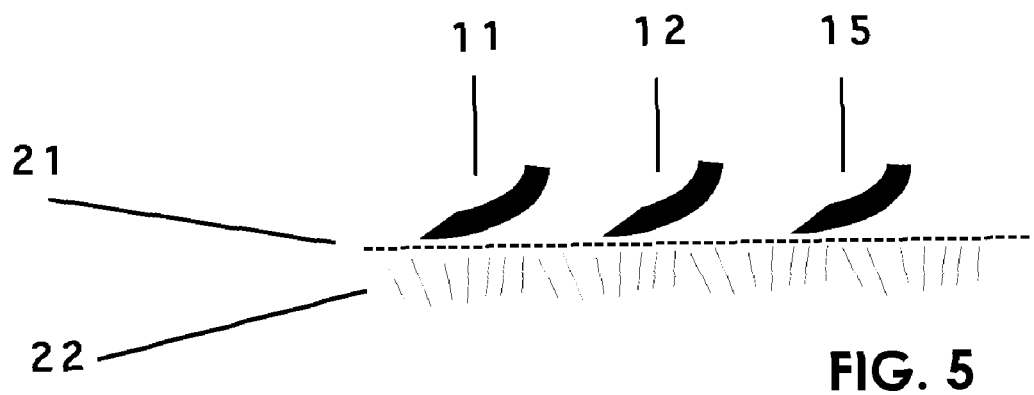
FIG. 5 is an edge view of the blade in FIG. 2 taken along the line 31, displaying multiple acute angled vegetation shredding and aerodynamic directing members 11 and 12, and the primary cutting member 15, where all cutting edges are set roughly to the same vegetation 22 cutting height 21. Blade cutting direction in this illustration is indicated by arrow 19.

Another variation of the embodiment, FIG. 5 shows a longitudinal edge view of blade 10 of FIG. 2 along line 31 which employs multiple vegetation shredding and aerodynamic vegetation directing members, detail 11 and 12, ahead of the primary cutting member 15. This arrangement where all cutting edges are configured to the same approximate cutting height is useful for mowing vegetation that would be trimmed many times per week, such as golf course grasses.

Figure 6:
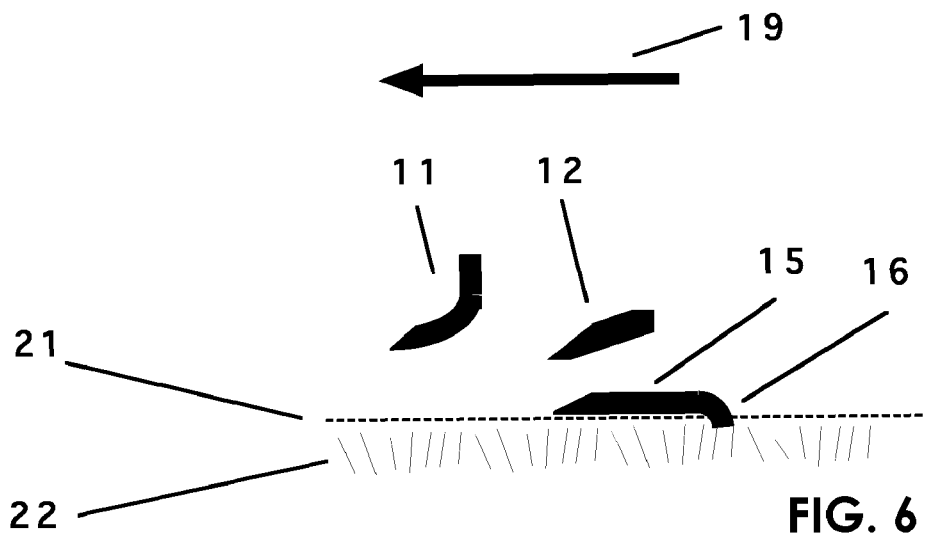
FIG. 6 is an edge view of the blade in FIG. 2 taken along the line 31, displaying multiple assorted angled vegetation shredding and aerodynamic directing members, detail 11 and 12, and the primary cutting member 15, including a downward curved trailing-edge aerodynamic feature 16. Vegetation shredding and aerodynamic directing members, detail 11 and 12, may vary their aerodynamic angle of attack, general shape, and elevation above the vegetation cutting height. Blade cutting direction in this illustration is indicated by arrow 19.

Another variation of the embodiment, FIG. 6 shows the longitudinal edge view of blade 10 of FIG. 2 along line 31 with the inclusion of multiple vegetation shredding and aerodynamic vegetation directing members in various orientations and elevations, detail 11 and 12, in relation to the cutting plane 21. The vegetation shredding and aerodynamic vegetation directing member arrangement in FIG. 6, detail 11 and 12, further improves mulching action since members 11 and 12 will cut vegetation at multiple levels while the vegetation is still attached to the vegetation's roots. The leading edge of the primary cutting member 15 then cuts the vegetation to the final cutting height 21. Aerodynamic pressures induced by the downturned trailing edge feature, detail 16, of the primary cutting member 15, decreases air pressure directly above member 15 thereby increasing aerodynamic action through the gaps between the vegetation shredding and aerodynamic vegetation directing members, detail 11 and 12. The downturned feature 16 also briskly loosens thatch by creating an air pressure disturbance directly under the trailing edge of member 15. FIG. 6 also illustrates a variety of straight and acute design angles and orientations of the vegetation shredding and aerodynamic vegetation directing members including mounting a vegetation shredding and aerodynamic vegetation directing member 12 approximately even with the primary cutting member, detail 15.

Figure 7:
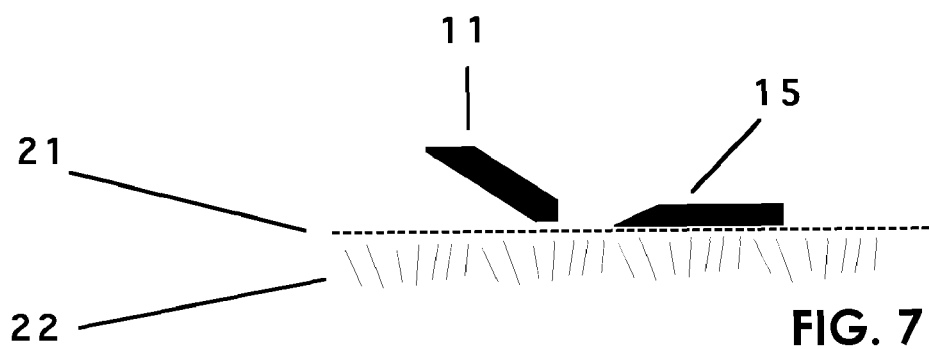
FIG. 7 is an edge view of the blade in FIG. 1 taken along the line 30, displaying one obtuse angled vegetation shredding and aerodynamic directing member 11, and the primary cutting member 15. Blade cutting direction in this illustration is indicated by arrow 19.

FIG. 7 illustrates the longitudinal view of blade 10 in FIG. 1 along line 30, with a vegetation shredding and aerodynamic vegetation directing member 11 oriented at an obtuse angle. Due to a trailing rotor type turbulent airflow pattern induced by the aerodynamic vegetation directing member 11, airflow is induced by this director member arrangement to enter though the space between member 11 and primary cutting member 15. This arrangement improves safety by pushing aside and deflecting foreign objects before the sharp edge on the primary cutting member 15 can impact and accelerate any foreign objects.

Figure 8:
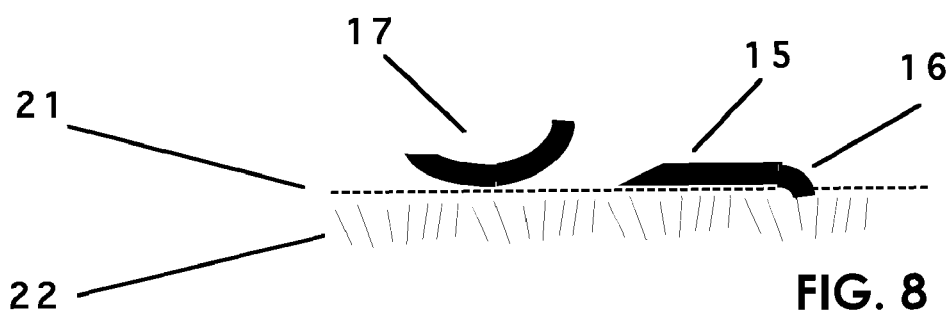
FIG. 8 is an edge view of the blade in FIG. 1 taken along the line 30 displaying an aerodynamic airfoil vegetation shredding and directing member incorporating both acute and obtuse angles, detail 17, ahead of the primary cutting member 15, including the downward-curved trailing edge aerodynamic feature 16. Said aerodynamic airfoil vegetation shredding and directing member 17 may vary in height and aerodynamic angle of attack. Blade cutting direction in this illustration is indicated by arrow 19.

FIG. 8 shows the longitudinal view of blade 10 in FIG. 1 along line 30, including combinations of previously listed features, employing both obtuse and acute angles on the vegetation shredding and aerodynamic vegetation directing member 17. Airflow is caused by this arrangement to enter though the gap between the first member 17 and primary cutting member 15, while simultaneously improving safety by nudging foreign objects, out and down before the sharpened edge of the primary cutting member 15 can forcibly strike and thereby accelerate the foreign objects. FIG. 8 also includes the dethatching trailing edge aerodynamic feature, detail 16.

I claim:

1. A blade for cutting vegetation, the blade connected to an external drive structure for rotating the blade through the vegetation, the blade comprising:
    a horizontal body member provided with a first end and a second end opposite said first end, each of said first and second ends provided with a primary cutting tine and a secondary cutting tine, each of said secondary cutting tines located anterior to each of said primary cutting tines in the direction of the rotation of the blade, each of said primary cutting tines and each of said secondary cutting tines provided with a forward cutting surface and a trailing surface, said forward cutting surface of each of said secondary tines is provided with a positive angle of attack, wherein said forward cutting surface of each of said secondary tines is directed upwardly.

2. The blade in accordance with claim 1, wherein said forward cutting surface of each of said secondary cutting tines is at a greater height than said forward cutting surface of said primary cutting tines.

3. The blade in accordance with claim 1, wherein said trailing surface of each of said secondary cutting tines is provided at an obtuse angle with respect to said forward cutting surface of each of said primary cutting tines.

4. The blade in accordance with claim 1, wherein each of said primary cutting tines provided with a downturned lip along said trailing surface of said primary cutting tines, said downturned lip extending below the height of said forward cutting surface of said primary cutting tines.

5. The blade in accordance with claim 2, wherein each of said primary cutting tines provided with a downturned lip along said trailing surface of said primary cutting tines, said downturned lip extending below the height of said forward cutting surface of said primary cutting tines.

6. The blade in accordance with claim 3, wherein each of said primary cutting tines provided with a downturned lip along said trailing surface of said primary cutting tines, said downturned lip extending below the height of said forward cutting surface of said primary cutting tines.

* * * * *